(12) United States Patent
Barber et al.

(10) Patent No.: US 8,161,396 B2
(45) Date of Patent: Apr. 17, 2012

(54) SYSTEM AND METHOD FOR FACILITATING COLLABORATION AND COMMUNICATION IN A VISUAL MAPPING SYSTEM BY TRACKING USER PRESENCE IN INDIVIDUAL TOPICS

(75) Inventors: Richard Barber, Berkeley, CA (US); Peter Hizalev, San Francisco, CA (US); Andrew Mochalskyy, San Francisco, CA (US); Stefan Funk, Larkspur, CA (US)

(73) Assignee: Mindjet LLC, San Francisco, CA (US)

( * ) Notice: Subject to any disclaimer, the term of this patent is extended or adjusted under 35 U.S.C. 154(b) by 820 days.

(21) Appl. No.: 12/004,122

(22) Filed: Dec. 20, 2007

(65) Prior Publication Data
US 2009/0164912 A1 Jun. 25, 2009

(51) Int. Cl.
*G06F 3/00* (2006.01)
*G06F 15/16* (2006.01)

(52) U.S. Cl. ........ 715/751; 715/733; 715/738; 715/739; 709/203

(58) Field of Classification Search .................. 715/751, 715/733, 738, 739; 709/203
See application file for complete search history.

(56) References Cited

U.S. PATENT DOCUMENTS

| | | | |
|---|---|---|---|
| 5,257,185 A | 10/1993 | Farley et al. | |
| 5,327,529 A | 7/1994 | Fults et al. | |
| 5,341,223 A | 8/1994 | Shigeeda et al. | |
| 5,548,749 A | 8/1996 | Kroenke et al. | |
| 5,555,357 A | 9/1996 | Fernandes et al. | |
| 5,597,312 A | 1/1997 | Bloom et al. | |
| 5,619,694 A | 4/1997 | Shimazu | |
| 5,627,979 A | 5/1997 | Chang et al. | |
| 5,787,417 A | 7/1998 | Hargrove | |
| 5,966,123 A | 10/1999 | Kaplan | |
| 6,037,944 A | 3/2000 | Hugh | |
| 6,121,971 A | 9/2000 | Berry et al. | |
| 6,148,311 A | 11/2000 | Wishnie et al. | |
| 6,191,786 B1 | 2/2001 | Eyzaguirre et al. | |
| 6,377,287 B1 | 4/2002 | Hao et al. | |

(Continued)

FOREIGN PATENT DOCUMENTS
EP  0 784 263 A1  7/1997
(Continued)

OTHER PUBLICATIONS

PCT Search Report and Written Opinion in corresponding PCT Application No. PCT/US2008/013917.

(Continued)

*Primary Examiner* — Tuyetlien Tran
*Assistant Examiner* — Dino Kujundzic
(74) *Attorney, Agent, or Firm* — Tina Lessani; Lessani Law Group, PC

(57) ABSTRACT

A visual mapping system and method facilitate communication and collaboration among users sharing visual maps or topics in visual maps. The visual mapping system tracks user presence in individual topics in the visual mapping system. User presence is tracked for users that are online. If an online user is present in a topic, the system displays an indication of such presence in the topic to other online users currently sharing the same topic. The visual mapping system also provides an interface in the visual map through which an online user can initiate communications with other online users that are present in a shared topic. Types of communications that can be initiated through the visual map include chat sessions, instant meetings, telephone calls, and email messages.

24 Claims, 17 Drawing Sheets

U.S. PATENT DOCUMENTS

| | | | |
|---|---|---|---|
| 6,496,208 B1 | 12/2002 | Bernhardt et al. | |
| 6,738,964 B1 | 5/2004 | Zink et al. | |
| 6,961,910 B2 * | 11/2005 | Lee et al. | 715/738 |
| 7,080,092 B2 | 7/2006 | Upton | |
| 7,181,438 B1 | 2/2007 | Szabo | |
| 7,313,766 B2 | 12/2007 | Kautto Kiovula et al. | |
| 7,627,828 B1 * | 12/2009 | Collison et al. | 715/751 |
| 2002/0030703 A1 | 3/2002 | Robertson et al. | |
| 2002/0049689 A1 | 4/2002 | Venkatram | |
| 2002/0076025 A1 | 6/2002 | Liversidge et al. | |
| 2002/0186238 A1 | 12/2002 | Sylor et al. | |
| 2003/0033274 A1 | 2/2003 | Chow et al. | |
| 2003/0065650 A1 | 4/2003 | Annand et al. | |
| 2003/0083922 A1 | 5/2003 | Reed | |
| 2003/0110253 A1 | 6/2003 | Anuszczyk et al. | |
| 2003/0137536 A1 | 7/2003 | Hugh | |
| 2003/0233631 A1 | 12/2003 | Curry et al. | |
| 2004/0030741 A1 | 2/2004 | Wolton et al. | |
| 2004/0093328 A1 | 5/2004 | Damle | |
| 2004/0193588 A1 | 9/2004 | Tago et al. | |
| 2004/0219493 A1 | 11/2004 | Phillips | |
| 2005/0132305 A1 | 6/2005 | Guichard et al. | |
| 2005/0147950 A1 | 7/2005 | Ortiz et al. | |
| 2006/0005164 A1 | 1/2006 | Jetter et al. | |
| 2006/0059135 A1 | 3/2006 | Palmon et al. | |
| 2006/0059143 A1 | 3/2006 | Palmon et al. | |
| 2006/0095474 A1 | 5/2006 | Mitra et al. | |
| 2006/0184886 A1 * | 8/2006 | Chung et al. | 715/758 |
| 2007/0106974 A1 | 5/2007 | Chafe et al. | |
| 2007/0239680 A1 | 10/2007 | Oztekin et al. | |
| 2007/0266040 A1 | 11/2007 | Figlin | |
| 2008/0001948 A1 | 1/2008 | Hirsch | |
| 2008/0208885 A1 | 8/2008 | Barber et al. | |
| 2009/0119572 A1 | 5/2009 | Koivunen | |

FOREIGN PATENT DOCUMENTS

| | | |
|---|---|---|
| EP | 1615145 | 1/2006 |

OTHER PUBLICATIONS

Librelotto et al., Extreme Markup Languages 2007, Montreal, Quebec, Aug. 7-10, 2007, pp. 1-15.

Lu, Yiling, Roadmap for tool support for collaborative ontology engineering, University of Victoria, 2003, pp. 1-119.

"Mindjet MindManager 6 User's Guide" [Online] 2005, XP-002481935. Retrieved from the Internet: URL: http://www.mindjet.com/pdf-eng/MindManager_6_Help_Guide.pdf, pp. 4, 177-180.

Spanger, S., et al., "Mindmap: Utilizing Multiple Taxonomies and Visualization to Understand a Document Collection," Proceedings of the 35th Annual Hawaii International, 2001.

Sumner, T., et al., "A Web Service Interface for Creating Concept Browsing Interfaces" D-Lib Magazine, Nov. 2004 vol. 10, No. 11, Nov. 2004, XP002580529 ISSN: 1082-9873.

"ThinkGraph: Introduction", Feb. 4, 2007. URL: http://www.thinkgraph.com.

Dokumentation zum Lernprogramm Mindmapping mit Freemind, Dec. 1, 2007, p. 63. URL: http://www.portal.schule.bremen.de/dokumente/loadzip/65760_v_0/projects/doc/lernmaterialfreemind.pdf.

* cited by examiner (Example of Visual Map)

*Topic Storage*

| Topic ID (510) | Title (520) | Parent Topic (530) |
|---|---|---|
| 1 | Things to Buy | NULL |
| 2 | Dog Food | 1 |
| 3 | Puppy Chow | 2 |
| 87 | Coffee | 1 |
| 56 | Milk | 1 |
| 802 | Government Recall Notices | NULL |
| 803 | Food | 802 |
| 804 | Toys | 802 |
| 725 | Spinach | 803 |
| 960 | Dog Food | 803 |
| 850 | Painted Trains | 804 |
| 853 | Toy motorcycles | 804 |
| 907 | Cars | 802 |
| 988 | Tires on Ford Explorer | 907 |
| 995 | Volvo Transmission | 907 |
| 997 | Honda Accord air conditioner | 907 |

FIG. 5A

*Map Storage*

| User (540) | Main Topic ID (550) |
|---|---|
| Jack | 802 |
| Jill | 1 |

FIG. 5B

*Change Log*

| Time | Topic ID | Type of Change |
|---|---|---|
| 8/9/07 12:15pm | 2 | Create |
| 8/10/07 1:35pm | 3 | Modify |
| 8/10/07 1:37pm | 809 | Delete |

FIG. 5C

*Workspaces*

| Workspace ID | Workspace Name |
|---|---|
| 1007 | Work |
| 1008 | Play |

FIG. 6A

*Workspace User*

| Workspace ID | User |
|---|---|
| 1007 | Jack |
| 1007 | Jill |
| 1008 | Jill |

FIG. 6B

*Workspace Maps*

| Workspace ID | Main Topic ID |
|---|---|
| 1007 | 802 |
| 1007 | 767 |
| 1007 | 985 |
| 1008 | 1 |
| 1008 | 675 |

FIG. 6C

SYSTEM AND METHOD FOR FACILITATING COLLABORATION AND COMMUNICATION IN A VISUAL MAPPING SYSTEM BY TRACKING USER PRESENCE IN INDIVIDUAL TOPICS

BACKGROUND OF THE INVENTION

1. Field of the Invention

This invention relates generally to visual mapping systems, and, more particularly, to tracking user presence in individual topics in a visual mapping system.

2. Description of the Background Art

A visual map is a diagram that represents ideas and/or information in topics. Examples of visual maps are mind maps, topic maps, semantic networks, and concept maps. Visual maps are increasingly used to help people generate, classify, and/or organize ideas and information and to see such ideas and information in a hierarchical, visual layout.

Visual maps are used for project management, work-flow analysis, organizational charts, and other purposes. FIG. 1 is an example of a visual map for information related to a wireless communication project meeting. The visual map in FIG. 1 is a mind map. Mind maps are made up of hierarchically-arranged topics. The main topics in FIG. 1 are "Action Items", "Purpose", "Agenda", "Time Place", "Participants", and "Purpose." Each of these topics has subtopics. For instance, "Implementation" is a subtopic for "Action Items," and "Carry out Launch" is a subtopic of "Implementation."

There are software programs that enable people to easily create visual maps. Mindjet, Inc.'s MINDMANAGER software is an example of such software.

When viewing or working on a shared visual map, it would be desirable to see what other users are also "present" in the map and to have the ability to easily initiate communications with such other users. There are known document sharing systems that display user "presence" on the document level for word processing and spreadsheet documents. For example, GOOGLE DOCS enables a user to see if another user currently has the same word processing or spreadsheet document open. However, known systems do not track and display user presence in individual sections or objects of a file. There is no known visual mapping system that enables user to see other users' presence in individual topics. Consequently, there is a need for a visual mapping system that displays user presence in individual topics. Also, there is a need for a file system that displays user presence in individual sections of a file.

SUMMARY

The present invention provides a visual mapping system and method that facilitates communication and collaboration with respect to visual maps. The visual mapping system tracks user presence in individual topics in the visual mapping system. User presence is tracked for users that are online. If an online user is present in a topic, the system displays an indication of such presence to other online users sharing the same topic. Presence is tracked and displayed at the individual topic level. It also can be tracked and displayed at the map level.

The system also provides an interface in the visual map through which the online user can initiate communications with other online users that are present in a shared topic. Types of communications that can be initiated through the visual map include chat sessions, instant meetings, telephone calls, and email messages.

Providing an interface through which users can initiate communications with other users present in a topic facilitates collaboration on topics in the visual mapping system. When a user sees another user present in a shared topic, the user can communicate with the other user to discuss such topic. The other user will have context for the discussion because he would have already selected, and presumably been viewing, the topic at the time the communication request is sent.

The method of the present invention can also be applied to track presence in individual parts/sections of other types of documents and files. In one embodiment, this involves treating different parts of a document/file as a separate data object. User presence is then tracked for each data object in the document/file. For example, each paragraph of a word processing document can be a separate data object, and a file system can track and display user presence in each paragraph. The system can provide an interface through which an online user can initiate communications with other online users sharing a data object.

BRIEF DESCRIPTION OF THE DRAWINGS

FIGS. 5a-5c illustrate an example of how topics are stored in a database.

FIGS. 6a-6c illustrate an example of how workspaces are stored in a database.

DETAILED DESCRIPTION OF THE PREFERRED EMBODIMENTS

In the preferred embodiment, the visual mapping system of the present invention is based on a client-server architecture. The system includes a client visual mapping application through which a user can view, create, and edit topics in a visual map. The system also includes one or more servers that communicate with the client visual mapping applications to manage the storage and retrieval of topics and maps in the visual mapping system.

In the visual mapping system of the present invention, different users can simultaneously view the same topic. In one embodiment, the system allows users to share the same visual map, and, therefore, users can view the same topic if they are viewing the same visual map. In a further embodiment (and the preferred embodiment), topics also can be shared across visual maps. In this embodiment, users can view and edit the same topic in different visual maps. In one implementation of such embodiment, topics are not stored as part of a map file, but stored individually. This enables topics to be individually retrieved, viewed, and edited by users (i.e., they can retrieve a particular topic as opposed to a whole map).

Figure 1:
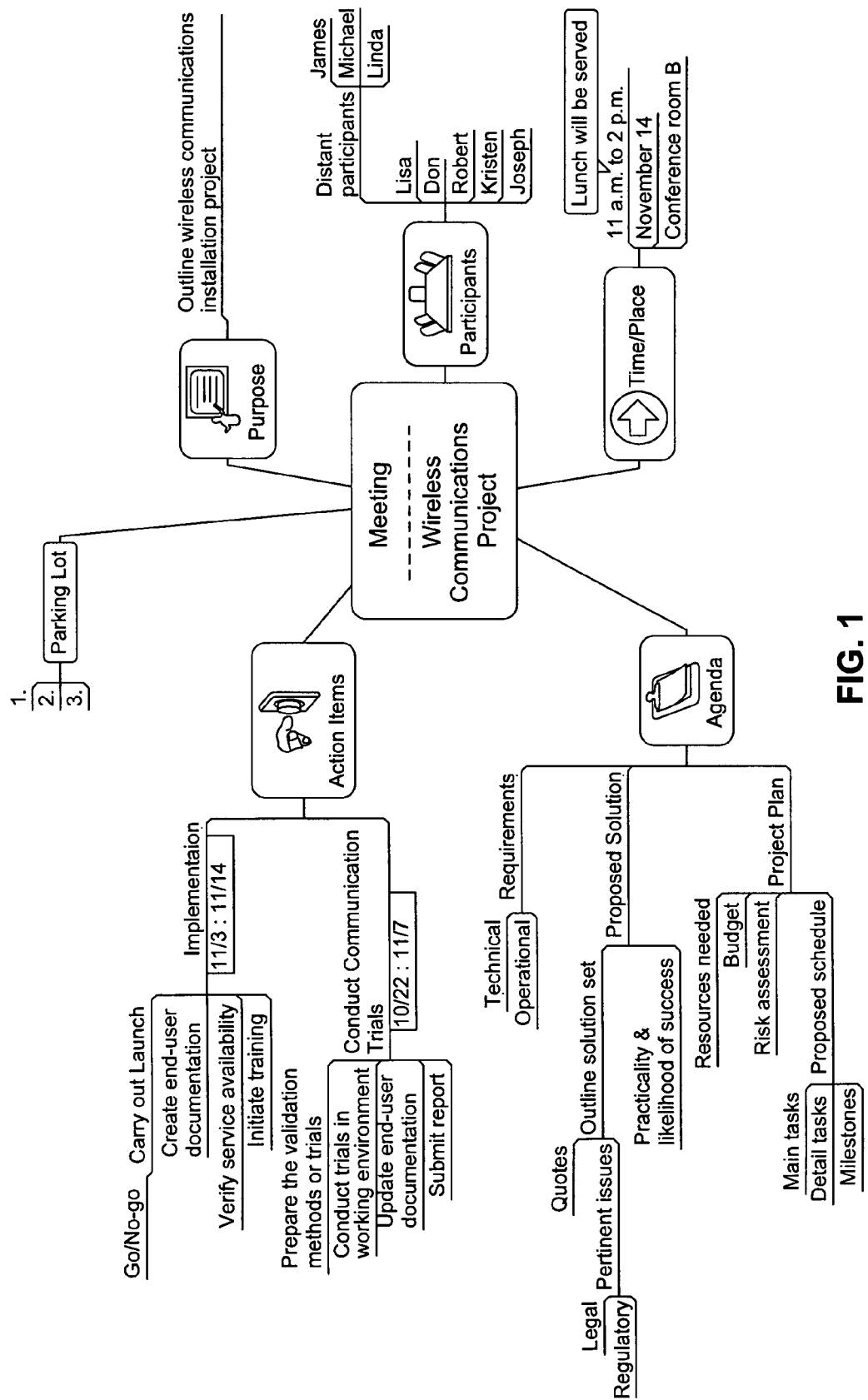
FIG. 1 is an example of a mind map.
Figure 2:
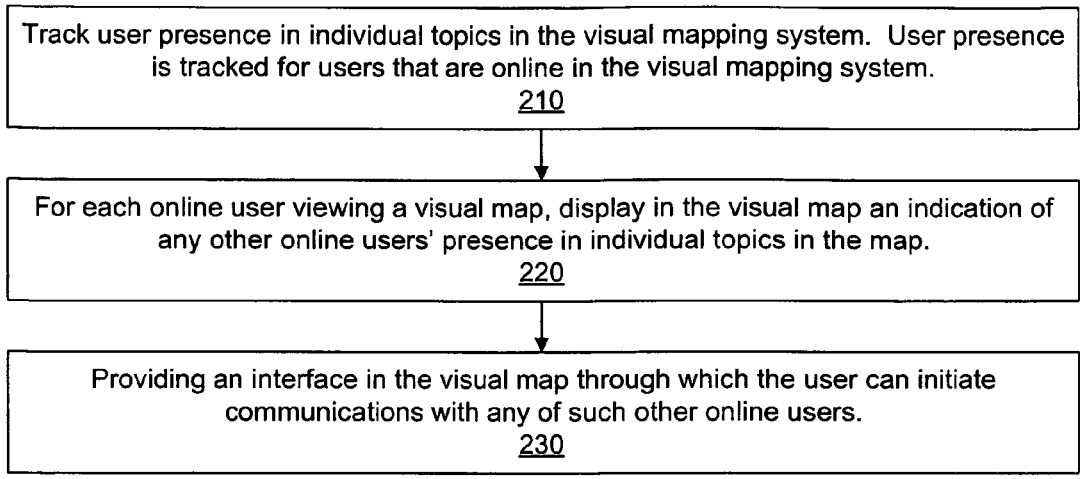
FIG. 2 is a flowchart that illustrates a method for facilitating user collaboration and communication in a visual mapping system where multiple users can share the same topic.

FIG. 2 illustrates a method for facilitating user collaboration and communication in a visual mapping system where multiple users can view the same topic (i.e., topics can be shared across users). The method comprises tracking online user presence in individual topics in the visual mapping system (210), displaying to an online user viewing a visual map an indication of any other online users' presence in individual topics in the visual map (220), and providing an interface in the visual map through which the online user can initiate communications with any of such other online users (230).

In the preferred embodiment, "presence" in a topic means the user has selected a topic. In alternate embodiments, it could mean that a user is editing a topic, or the topic exists in a map that the user has opened. The presence is tracked for users that are "online" in the visual mapping system.

In the preferred embodiment, "online" means that the user's client visual mapping application can communicate, via a network, with a server in the visual mapping system. Offline means that the user is working locally on his computer, and such user's client visual mapping application is neither sending information to nor receiving information from a server in the visual mapping system.

When an online user is viewing a map, there are many different ways in which the client visual mapping application can display to the user an indication of any other online users' presence in individual topics in the map. The indication can be graphical, textual, or both. Examples of an indication include a symbol, tag, icon, and a specific type of formatting.

Figure 3A:
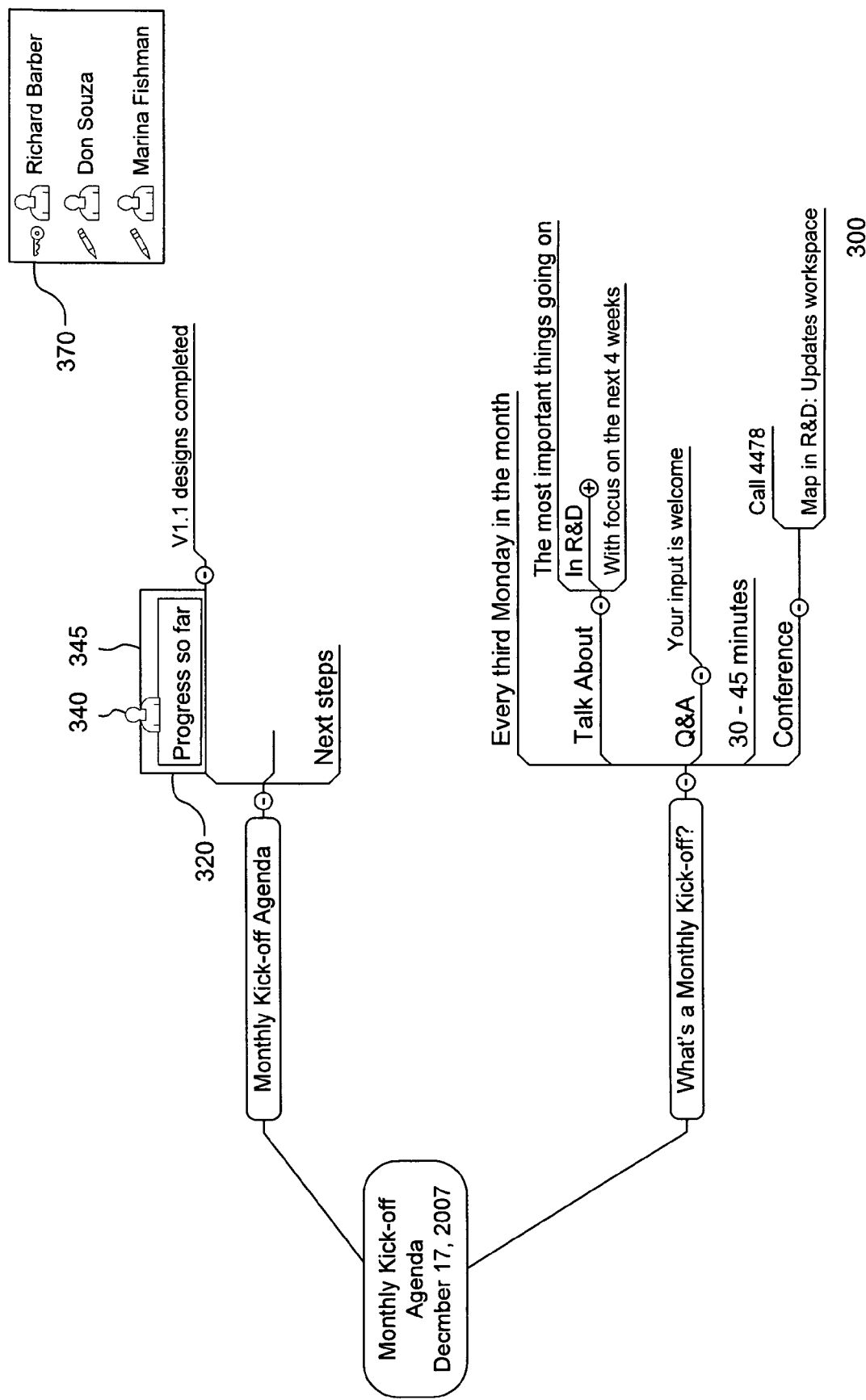
FIGS. 3a-3f are example visual maps that illustrate an example implementation of the present invention.
Figure 3B:
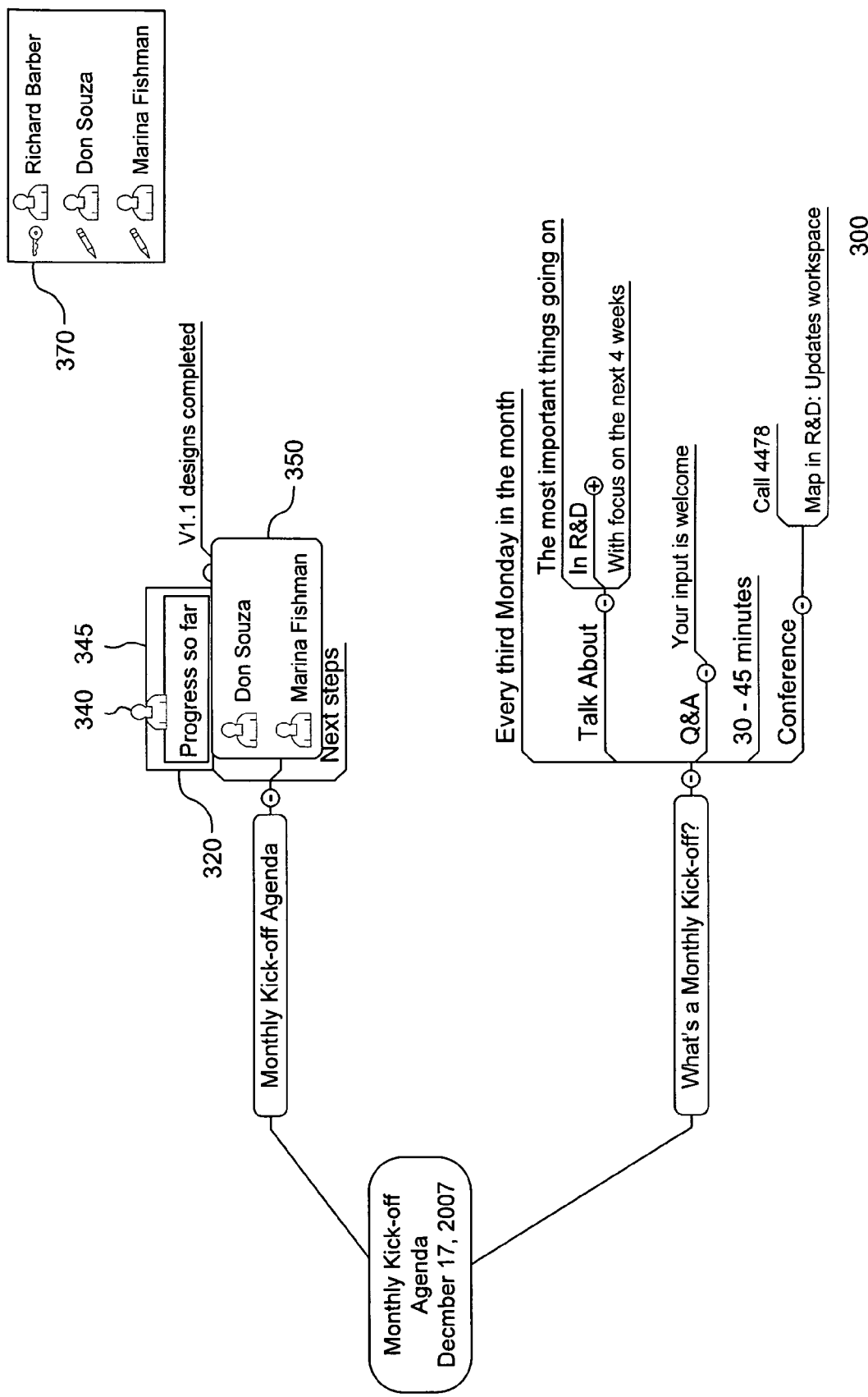
Figure 3C:
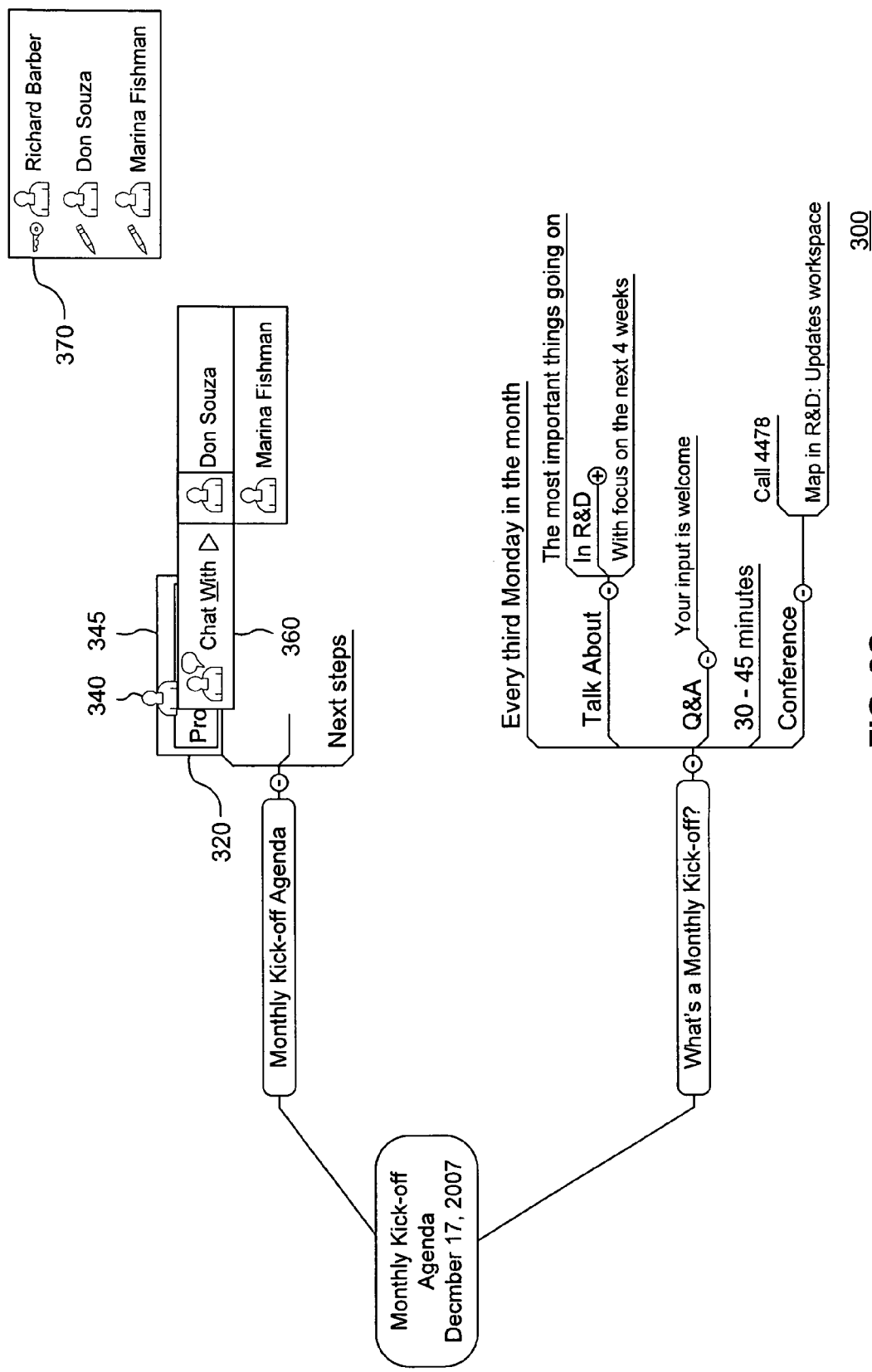
Figure 3D:
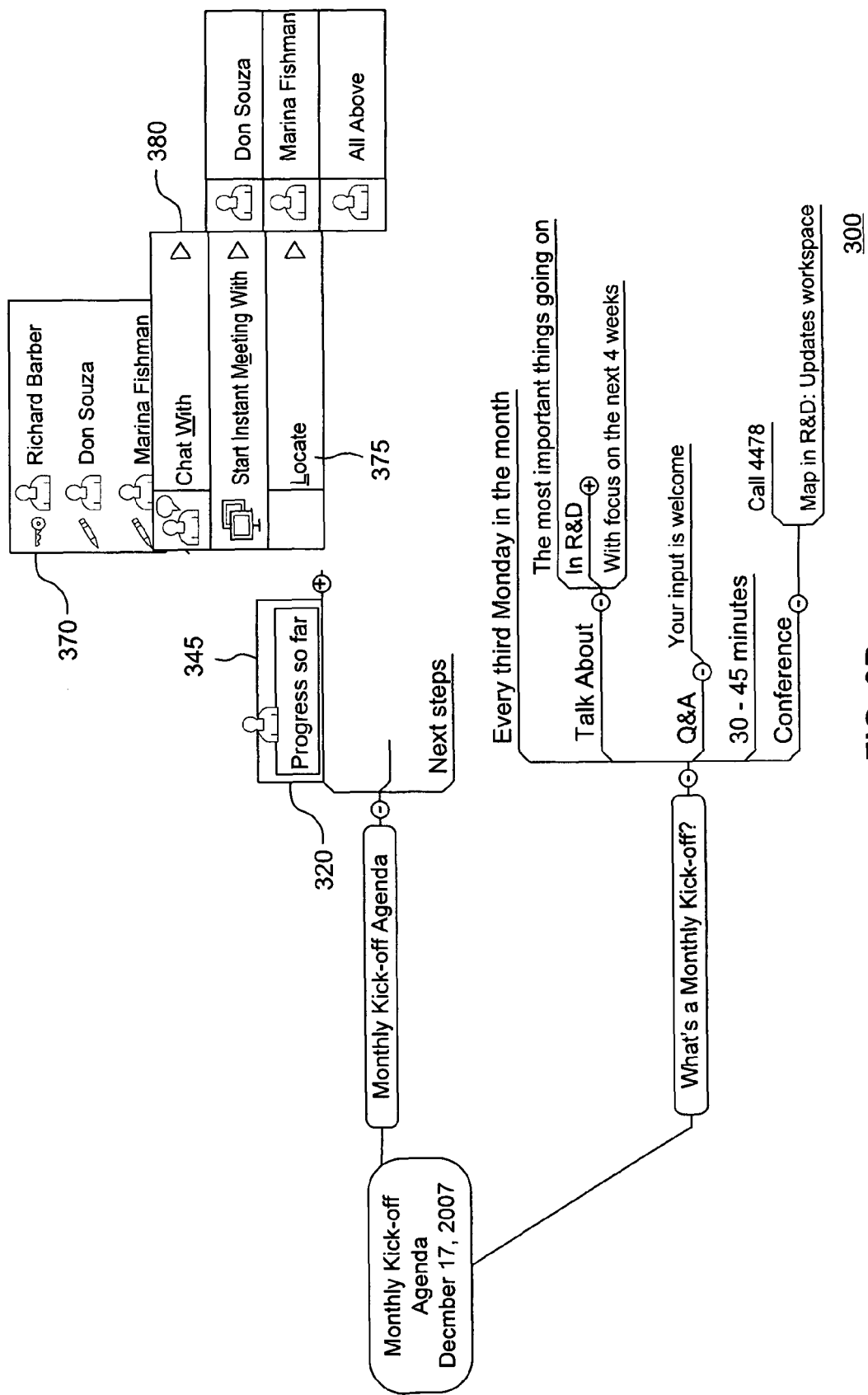

FIG. 3a illustrates an example of a visual map 300 in which presence in individual topics is displayed. In this example, a person-shaped icon 340 represents that another online user is present in topic 320. Also, the topic is outlined with a border 345. The border 345 may be a different color than the border that surrounds a topic when the user viewing the map selects a topic. As shown in FIG. 3b, when the user of the map "mouses over" either icon 340 or topic 320, he sees a box 350 that lists the other online users who are present in the topic (i.e., who have selected the topic in their respective client visual mapping applications). In this example, users Don Souza and Marina Fishman have presence in topic 320 (i.e., they have selected this topic in their respective client visual mapping application). In a visual mapping system where topics can be shared across maps, Don Souza and Marina Fishman need not be viewing the same map as the map 300 in FIGS. 3a and 3b. Rather, they can be viewing different maps that include topic 320.

Figure 3E:
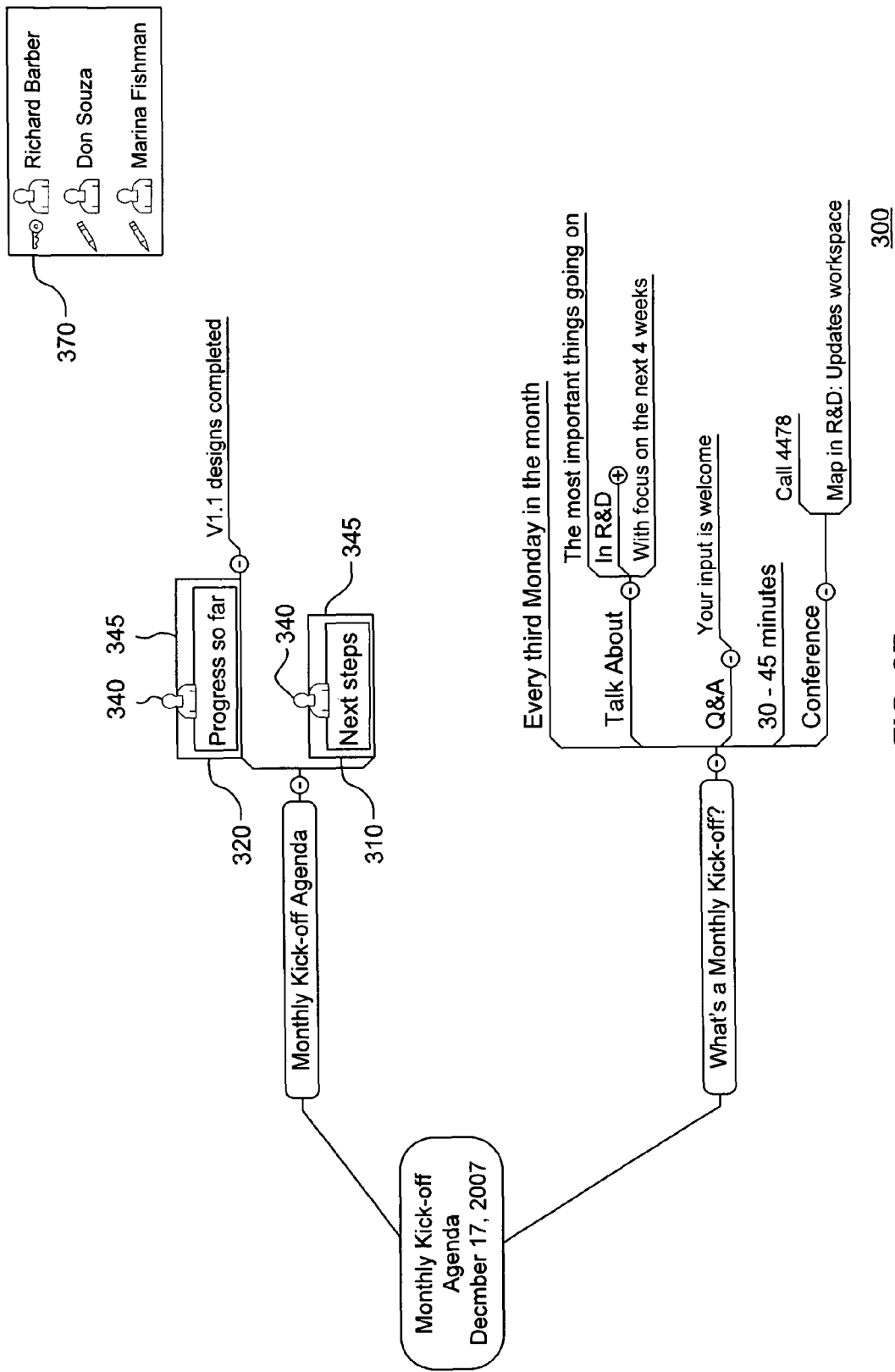
Figure 3F:
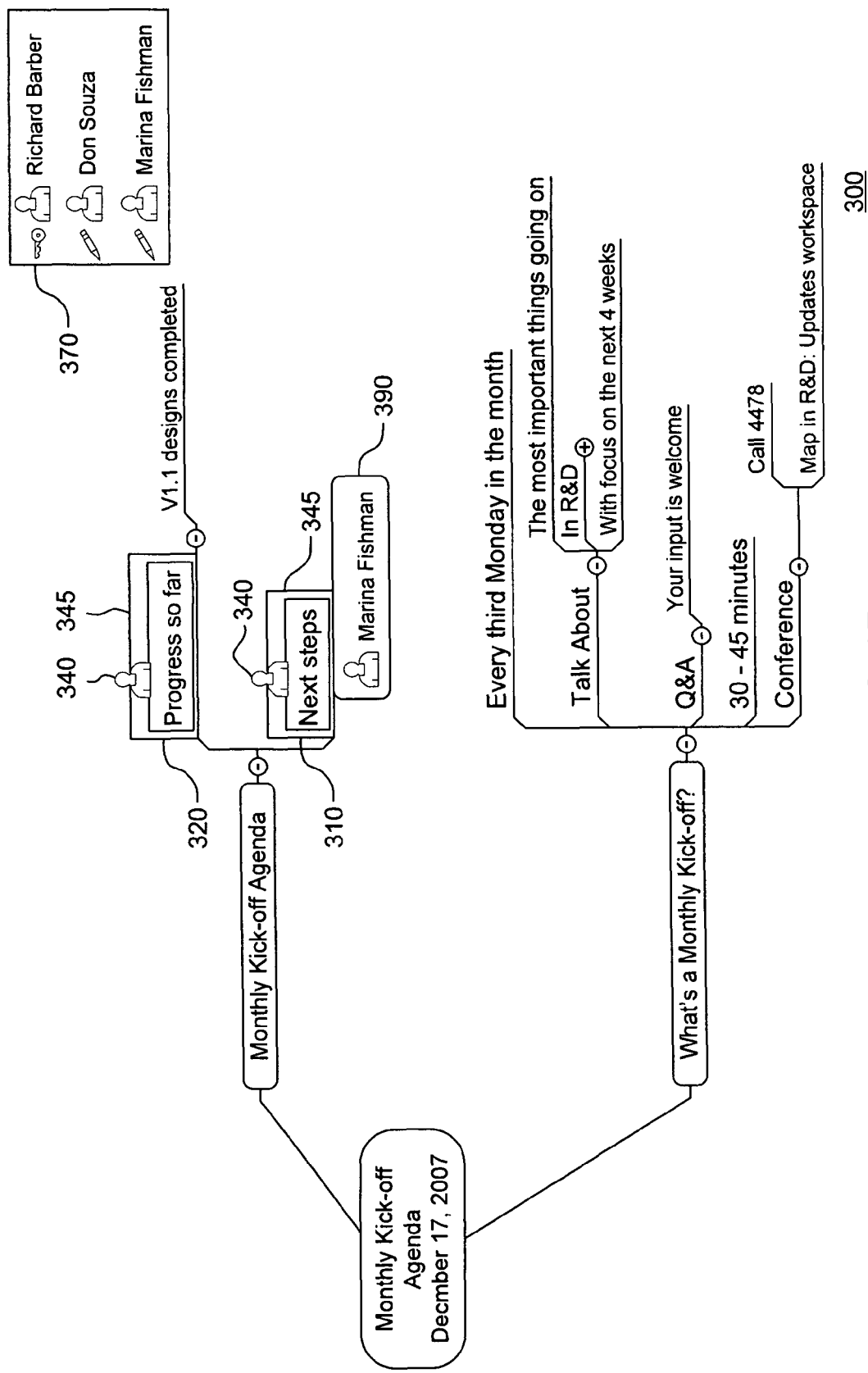

FIG. 3e illustrates another example. In this example, icon 340 indicates that there is other online user presence in both topics 310 and 320. As shown in FIG. 3f, when the user of the map 300 mouses over either topic 310 or icon 340 in topic 310, he sees a box 390 that shows that Marina Fishman is present in topic 310.

In the illustrated examples, one icon 340 is used to illustrate presence, regardless of the number of users actually present in a particular topic. In an alternate embodiment, there could be a separate icon that represents each user present in a topic. For example, in the map 300 in FIG. 3a, there could be one icon labeled "Don" that represents the presence of Don Souza, and another icon labeled "Marina" that represents the presence of Marina Fishman.

In the example in FIGS. 3a-3d, the user of map 300 mouses over icon 340 to see box 350. Similarly, the user of map 300 in FIG. 3e mouses over icon 340 is see box 390 shown in FIG. 3f. However, those skilled in the art will appreciate that there are other ways to illustrate user presence, and the invention is in no way limited to the example described with respect to FIGS. 3a-3f. For instance, a user could double click or right click on icon 340 to see a list of users present in topic 320.

As stated above, the client visual mapping application provides an interface through which users can initiate communications. Examples of such an interface include a dialog box and a menu. For instance, in FIG. 3c, when the user right clicks on icon 340, he sees a menu 360 that enables the user initiate a chat session with either Don Souza or Marina Fishman. The menu 360 could include other modes of communication, such as, for example, telephone (voice over IP), instant meeting, and email.

Providing an interface (such as menu 360) through which users can initiate communications with other users present in a topic facilitates collaboration on topics in the visual mapping system. When a user sees another user present in a shared topic, the user can communicate with the other user to discuss such topic. The other user will have context for the discussion because he would have already selected, and presumably been viewing, the topic at the time the communication request is sent.

In one embodiment of the invention, the client visual mapping application also displays an indication of presence on the map level. For instance, box 370 in FIGS. 3a-3f lists the other online users that are present in (i.e., have opened) map 300. The client visual application can provide an interface through which the user of map 300 in FIG. 3 can initiate communications with other users of map 300. For example, by mousing over box 370 in FIGS. 3a-3f, a menu 380 (FIG. 3d) is displayed that enables the user to initiate a chat session or an instant meeting with one or more of the users listed in box 370. There is also a locate command 375, which enables the user of the map 300 to locate the specific topic in which a user listed in box 370 is present. If the user of map 300 in FIG. 3d elects to "locate" Don Souza, the client visual mapping application would highlight topic 320.

Figure 4:
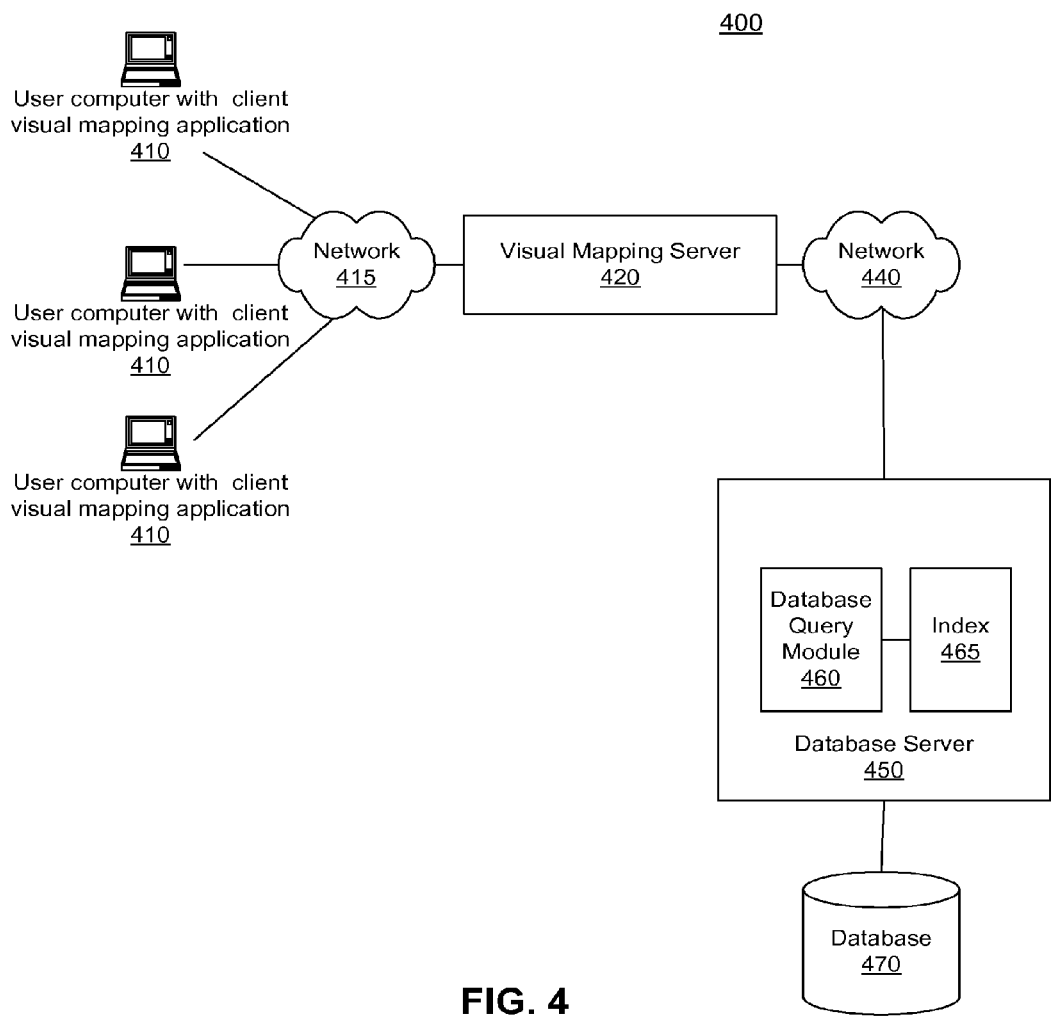
FIG. 4 is a block diagram of an example visual mapping system according to one embodiment of the present invention.

FIG. 4 is a block diagram of an example visual mapping system that enables topics to be shared across maps. The system includes client visual mapping applications 410, a visual mapping server 420, a database server 450, and a database 470. The visual mapping server 420 communicates with client mapping applications 410 to send and receive topics to client visual mapping applications 410. When the visual mapping server 420 receives topics from client visual mapping applications 410, the visual mapping server 420 sends the topics to a database query module 460 on the database server 450, which stores the topics in the database 470. Topics are stored individually in the database 470. A description of how topics are stored individually in a database is described with respect to FIGS. 5-8. The database query module 460 creates and maintains and index 465 of the topics stored in the database 470.

When a user searches for a map or a topic, the user's client visual mapping application 410 sends the search criteria to the visual mapping server 420. The visual mapping server 420 formulates a search query for the applicable topics and sends the query on to the database query module 460, which searches the index 465 for topics meeting the search criteria. A list of topics/maps meeting the search criteria is then sent to the visual mapping server 420, which forwards the list to the applicable client visual mapping application 410. If a user wants to load a topic or map into the client visual mapping application, the client visual mapping application 410 requests the topic/map from the visual mapping sever 420, which then formulates an applicable query for the database query module 460. The database query module 460 retrieves from the database 470 the requested topic, or in the case of a map, the topics in the map, and sends them to the visual mapping server 420, which passes them on to the applicable client visual mapping application 410. More details of how a user can search and retrieve topics and visual maps in the visual mapping system are described in the co-pending application titled "System and Method for Enabling a User to Search and Retrieve Topics in a Visual Map on an Individual Basis," filed on Dec. 12, 2007 with inventors Richard Barber, Peter Hizalev, Andrew Mochalskyy, and Stefan Funk, the contents of which are incorporated by reference as if fully disclosed herein.

In one embodiment, the visual mapping server and the database query module communicate with each other via network 440, which may be a private network or the Internet (or a combination of both). In one embodiment, the client visual mapping application and the visual mapping server communicate with each other via network 415, which may be a private network or the Internet (or a combination of both).

A client visual mapping application 410 may be a software application running on a user's computer or may be a browser-based application (where a user interfaces with the visual mapping server 420 through a web browser).

In one embodiment, the client visual mapping application 410 communicates with the visual mapping server 420 using SOAP or other XML messages, the visual mapping server 420 communicates with the database query module 460 in XML or SOAP, and the database query module 460 communicates with the database using SQL.

Those skilled in the art will appreciate that FIG. 4 illustrates one example of a visual mapping system of the present invention and there are other ways to implement a visual mapping system with a client-server architecture. For instance, there could be multiple servers serving the client visual mapping applications 410. Moreover, the visual mapping server 420 and the database server 450 could be the same server. Furthermore, topics can be stored in more than one database (e.g., there can be multiple databases connected through a network).

Furthermore, those skilled in the art will appreciate that the present invention need not be implemented in a system where topics are stored individually in a database. For example, in a system where topics are stored as part of a map file, information related to user presence in a topic can be stored as part of the topic data in the map file.

Figure 9:
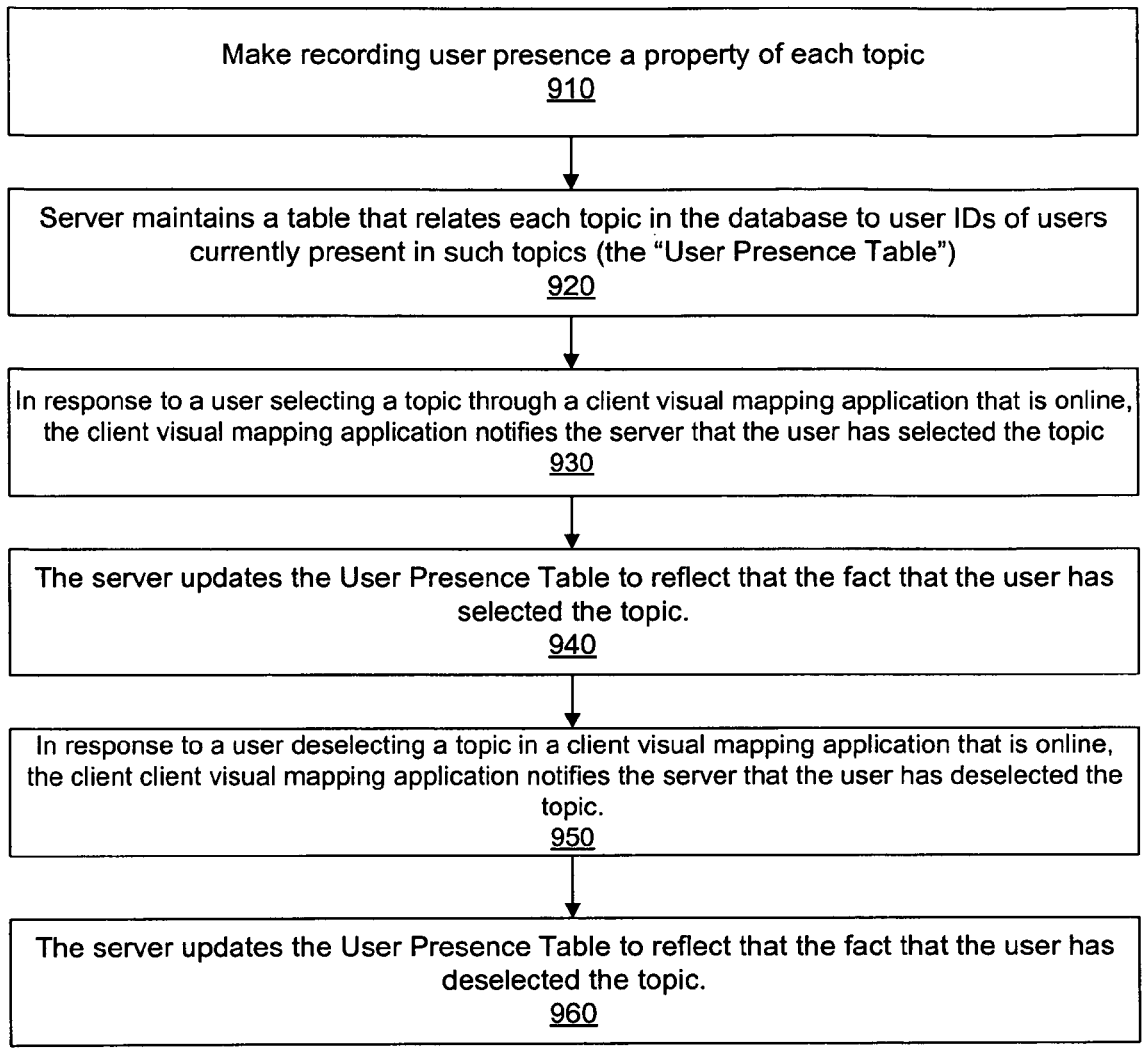
FIG. 9 is a flowchart that illustrates an example method for tracking user presence in individual topics.

FIG. 9 is a flowchart that illustrates an example of how the visual mapping system 400 illustrated in FIG. 4 can track presence in topics. In this system, it is a property of a topic to record user presence (910). The server 420 (via database server 450) maintains a table in the database 470 that relates each topic stored in the database 470 with the users that are currently present in such topics (the "User Presence Table") (920). In response to a user selecting a topic in a client visual mapping application 410 that is online, the client visual mapping application 410 notifies the server 420 that the user has selected a particular topic (930). The server 420 (via database server 450) then updates the User Presence Table to reflect the fact that the user is present in that particular topic (step 940). Specifically, in the entry (or entries) corresponding to such topic in the User Presence Table, the user's ID is added to the list of users present in such topic. In response to a user deselecting topics in client visual mapping application 410 that is online, the client visual mapping application 410 notifies the server 420 that the user has deselected a particular topic (950), and the server 420 updates the User Presence Table accordingly (960).

Figure 10:
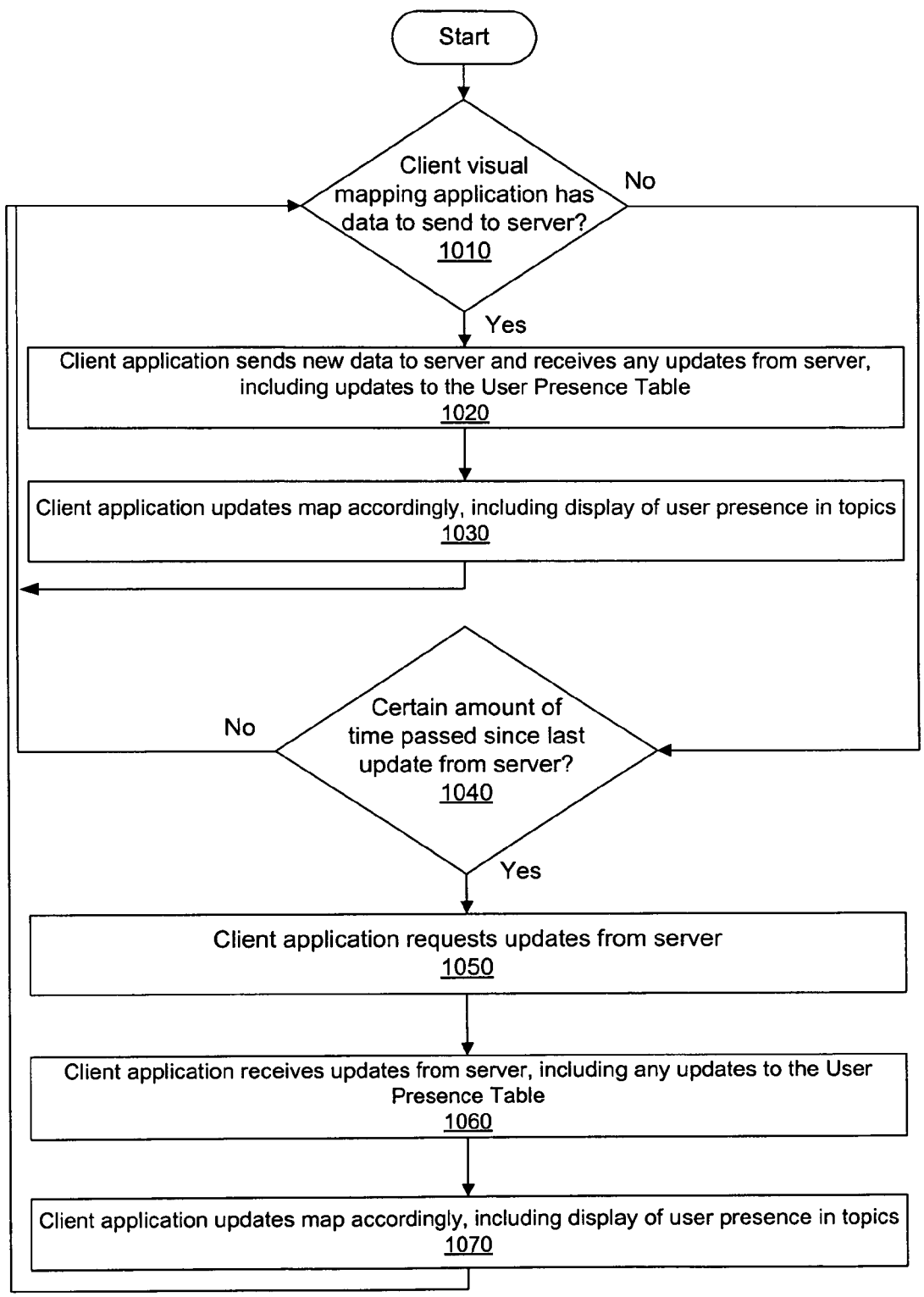
FIG. 10 is a flowchart that illustrates a method for propagating user presence information to client visual mapping applications.

FIG. 10 is a flowchart that illustrates how data related to user presence in topics is propagated to client visual mapping applications 410. If a client visual mapping application has data to send to server 420 (step 1010), the client visual mapping application sends the data to the server 420 and in return receives all updates relevant to the client visual mapping application 410 from the server 420, including relevant updates to the User Presence Table (step 1020). If there are relevant updates to the User Presence Table, the client visual mapping application 410 updates the display of user presence in topics accordingly (step 1030). The client visual application 410 then returns to the state in step 1010.

If the client visual mapping application does not have data to send to the server, the client visual mapping application determines if a certain minimum amount of time (e.g., 10 seconds) has passed since the client visual mapping application received an update from server 420 (step 1040). If such minimum amount of time has not passed, then the client visual mapping application 410 returns to the state in step 1010. Otherwise, the client visual mapping application 410 requests an update from the server 420 (step 1050). The sever 420 then sends the client visual mapping application 410 all updates relevant to the client visual mapping application 410, including relevant updates to the User Presence Table (step 1060). If there are relevant updates to the User Presence Table, then the client visual mapping application 410 updates the display of user presence in topics accordingly (step 1070).

Figure 11:
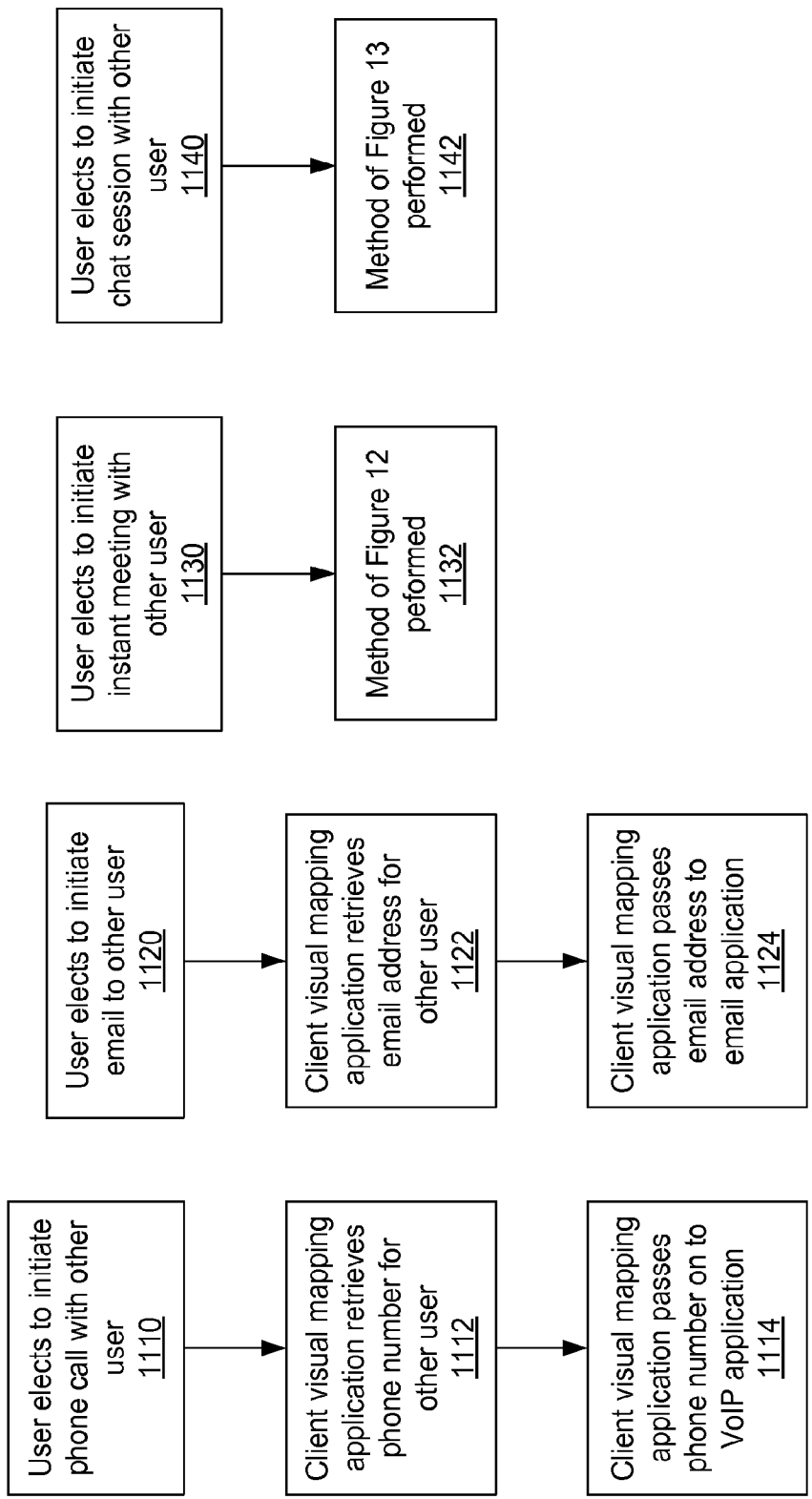
FIG. 11 is a flowchart that illustrates a method for initiating various forms of communication from a client visual mapping application.

FIG. 11 illustrates how the client visual mapping application can initiate various forms of communication. If a user elects to initiate a phone call to another online user present in a topic (1110), the client visual mapping application retrieves the phone number associated with the other user (1112) and passes it on to a Voice over IP (VoIP) phone application (1114), which dials the phone number from the initiating user's IP phone. If a user elects to send an email to another online user present in a topic (1120), the client visual mapping application looks up the email address associated with the other user (1122), and passes it on to an email application (1124), which opens up a new email message in the initiating user's email account. If the user elects to initiate an instant meeting (1130), the visual mapping system, in conjunction with an instant meeting system, performs the steps illustrated in FIG. 12 (1132). Similarly, if the user elects to initiate a chat session (1140), the visual mapping system, in conjunction with a chat system, performs the steps illustrated in FIG. 13 (1142).

In the preferred embodiment, when a user loads a topic into a map, topic metadata accompanies the topic content data from the server. The server sends updates to topic metadata when it sends other updates to the client visual mapping application. If other users are present in a topic, the topic metadata includes information about such other users, such as their user ID, telephone number, and email address. Consequently, the client visual mapping application can look up such information when needed (e.g., steps 1112 and 1114 in FIG. 11). In an alternate embodiment, the client visual application can request such information from the server in real-time.

Figure 12:
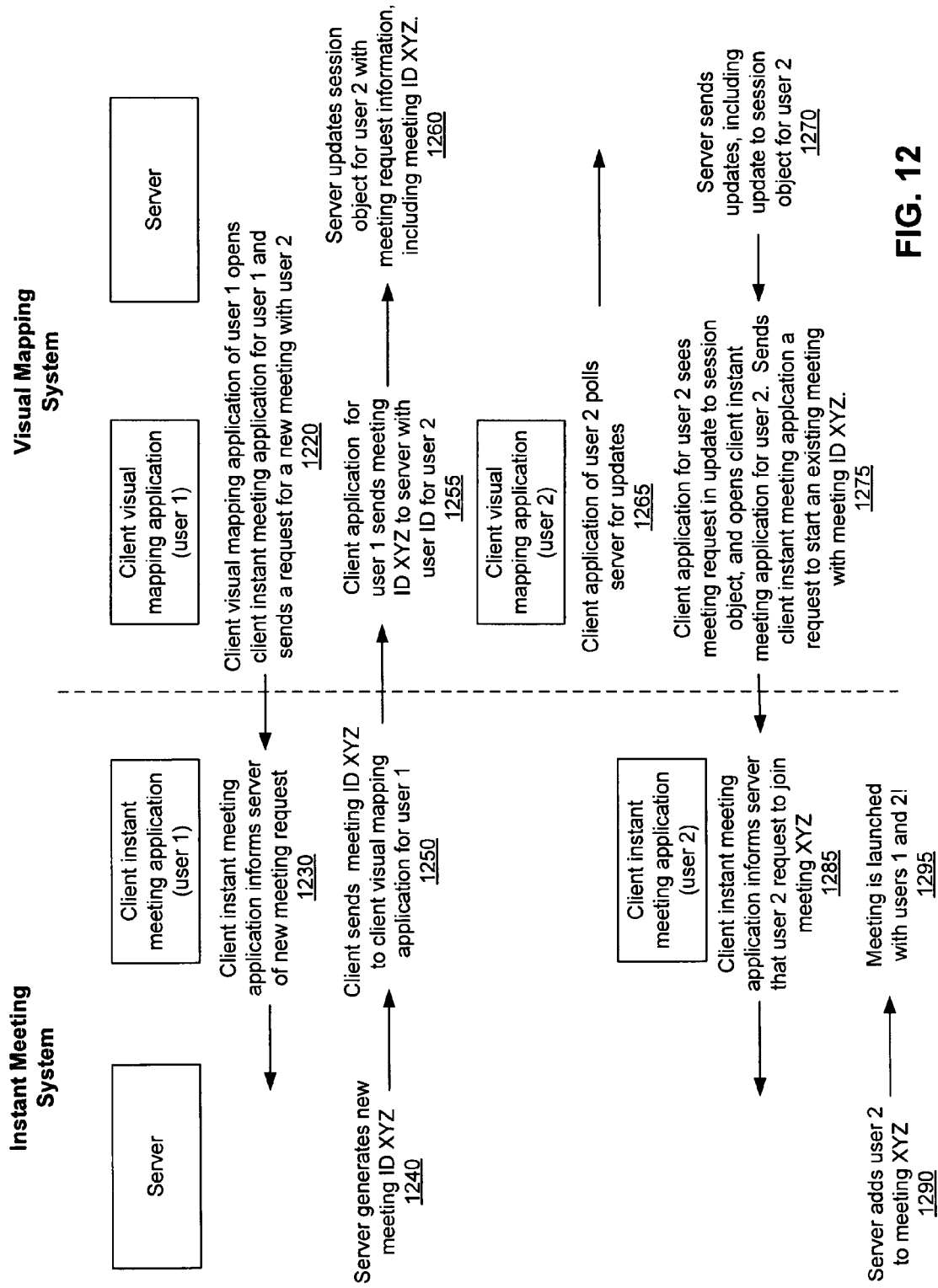
FIG. 12 is a flowchart that illustrates a method for setting up an instant meeting through a client visual mapping application.

FIG. 12 illustrates an example of how instant meeting can be set up through a visual map. In this example, user 1 has elected to initiate an instant meeting with user 2 through an interface in a visual map, such as interface 360 or 380 in FIGS. 3*c* and 3*d* respectively. The client visual mapping application of user 1 opens the instant meeting client application for user 1 and sends instant meeting client a request for a new meeting with user 2 (1220). The instant meeting client informs the server of the new meeting request (1230), and the server generates new meeting ID "XYZ" for the meeting (1240). The client instant meeting application sends meeting ID XYZ to the client visual mapping application for user 1 (1250), and the client visual mapping application for user 1 sends the meeting request, with meeting ID XYZ and the user ID for user 2, to a server in the visual mapping system. (1255)

The visual mapping server maintains a session object for each user that is online. The session object contains information about a user's visual mapping session. A session object can include different session sub-objects that manage particular parts of user's mapping session. For example, that may be a session sub-object that manages instant meetings.

In response to the server receiving the meeting request, the server updates the session object for user 2 with the meeting request information, including the meeting ID XYZ and the user ID for user 1 (1260).

The client visual mapping application for user 2 polls the server for updates (1265) (such as described with respect to FIG. 10). The server sends the client visual mapping application all applicable updates, includes updates to the session object for user 2 (1270). The client application for user 2 sees the meeting request in the update to the session object, and it displays the meeting request to user 2. If user 2 accepts the instant meeting request, the client visual mapping application starts the instant meeting client application for user 2, and sends the instant meeting client a request to join an existing meeting with meeting ID XYZ (1275).

The instant meeting client application for user 2 informs the server in the instant meeting system that user 2 requests to join the meeting with ID XYZ (1285). After determining that user 2 is authorized to join meeting XYZ, the server adds the user to meeting XYZ (1290), and an instant meeting is launched with users 1 and 2 (1295).

Figure 13:
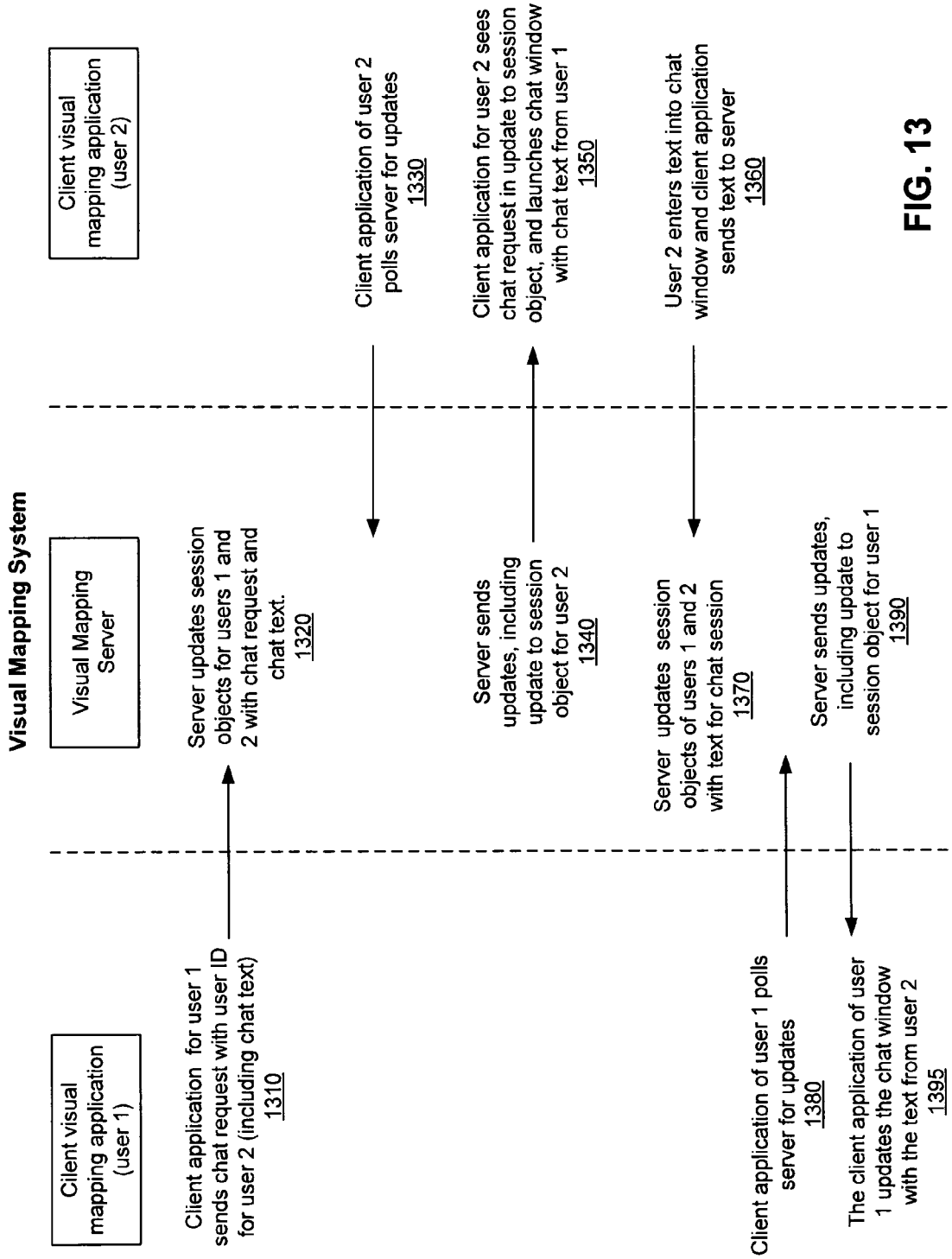
FIG. 13 is a flowchart that illustrates a method for providing a chat session through a client visual mapping application.

FIG. 13 illustrates an example of how a chat session can be set up through a visual map. In this example, user 1 has elected to initiate a chat session with user 2 through an interface in a visual map, such as interface 360 or 380 in FIGS. 3*c* and 3*d* respectively.

The client visual mapping application for user 1 sends a chat request with the user ID for user 2 to the server (1310). The server updates the session objects for user 2 and user 1 with the chat request and the chat text from user 1 (1320).

The client visual mapping application for user 2 polls the server for updates (1330). The server sends the applicable updates to the client visual mapping application, including the updates to the session object for user 2 (1340). When the client application for user 2 receives the updates, it sees the chat request in the session object and launches a chat window with the chat text from user 1 (1350).

User 2 enters text into the chat window. The client application for user 2 sends the new text to the server (1360), and the server updates the session objects for users 1 and 2 with the new text (1370).

The client application for user 1 polls the servers (1380) and, in return receives updates that include the updated session object for user 1 (1390). The client application for user 1 updates the chat window with the text from user 2 (1395). This continues for as long as user 1 and user 2 engage in a chat session.

As stated above, in the preferred embodiment, the visual mapping systems stores topics individually in a database so that topics can be separately retrieved and edited. This enables topics to be shared not only across users, but also across maps (i.e., the same topic could be in different maps). The system also can store maps and workspace information in the database.

Figure 7:
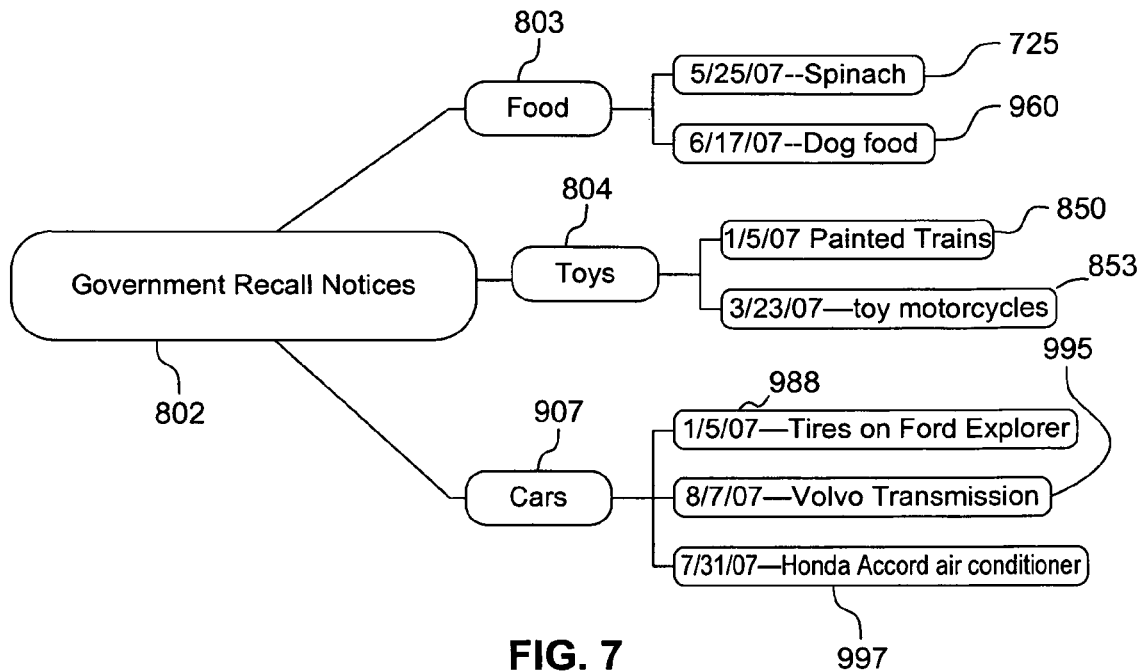
FIGS. 7 and 8 are example visual maps discussed in conjunction with FIGS. 5a-5c and 6a-c.
Figure 8:
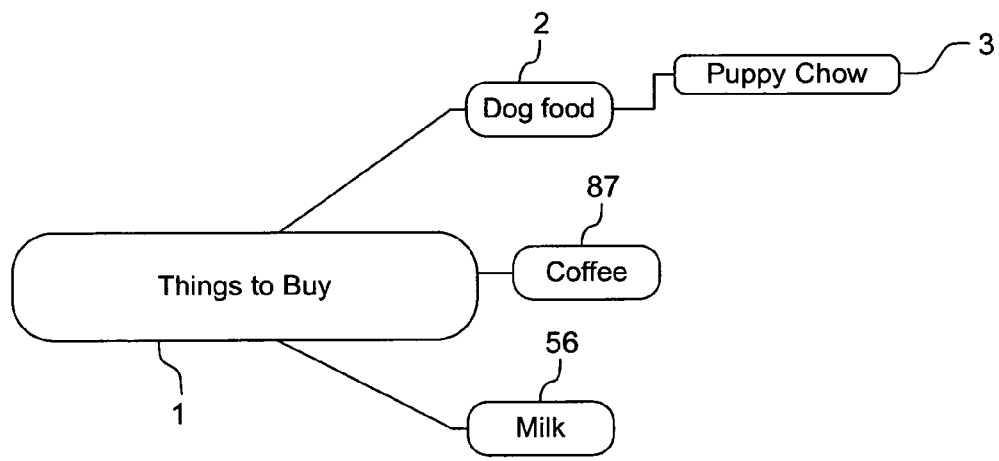

FIG. 5*a*-5*c* and 6*a*-6*b* are example, simplified tables that illustrate how topics, maps, and workspaces can be stored in a database. These examples are described with respect to the example maps in FIGS. 7 and 8. In the illustrated embodiment, topics are stored in tables. FIG. 5*a* is an example of a table for storing maps. The table includes a column for topic ID 510, topic title 520, and the parent topic ID 530. Each topic is associated with a unique ID. For the purposes of this example, the reference numbers in FIGS. 7 and 8 are the same as the unique IDs. Column 510 stores the topic ID, column 520 stores the title of the topic, and column 530 lists any direct parent topic of a topic. For instance, the central topic "Things to Buy" in FIG. 8 has topic ID "1". Since it does not have a parent topic, "NULL" is in the database entry for the Parent Topic column 530. The topic called "Puppy Chow" has the topic "Dog Food" with topic ID "2" as a parent, and, therefore, "2" is the entry in Parent Topic ID column 530 for the "Puppy Chow" topic 3. FIG. 5*a* shows only three columns for simplicity purposes, but the topic table could store much more information about topics and have many more columns, such as columns that have flag information, topic class information, comments, the date created, etc.

FIG. 5*b* illustrates an example of how maps are stored. In this embodiment, a map is just the central or primary topic in the map from to which all other topics directly or indirectly connect. The table in FIG. 5*b* has two columns. Column 540 lists the users that created each map, and column 550 lists the topic ID of the main topic in the visual map. In this example, user Jack has created the map "Government Recall Notices" where the primary topic has topic ID "802." User Jill has created the map "Things to Buy" where the primary topic has topic ID "1."

FIG. 5*c* illustrates a Change Log table. The Change Log table lists each change associated with a topic. For instance, the table shows that the topic with topic ID "2" ("Dog Food" in FIG. 8) was created at 12:15 pm on Aug. 9, 2007. The table also shows that the topic with topic ID "3" ("Puppy Chow" in FIG. 8) was modified at 1:35 pm on Aug. 10, 2007, and that a topic with topic ID "809" was deleted at 1:37 pm on Aug. 10, 2007. The Change Log table enables users to see the change history of each topic. Client visual mapping applications can regularly poll this table to dynamically obtain updates to topics. FIG. 5*c* illustrates a simple Change Log table, but Change Log table could include much more detail about changes. For instance, there could be a "user" column that indicates who made the change, and there could be a column that specifies the details of the change.

In one embodiment, the visual mapping system supports workspaces, where users belonging to a workspace can share documents in the workspace. Workspaces are assigned IDs, and FIG. 6*a* illustrates a table database that relates a workspace ID to its name. In this example, there are two workspaces, one labeled "Work" and one labeled "Play". FIG. 6*b* illustrates table that stores the names of users that are associated with each workspace. Both Jill and Jack belong to the workspace "Work" and Jill belongs to the workspace labeled "Play."

FIG. 6*c* is a table that relates each workspace to a map by relating each workspace to the main topic ID for the map (e.g., the central topic). In this example, workspace "1007" ("Work") includes maps having main topic IDs "802," "767" (map not shown), and "985" (map not shown). Workspace "1008" ("Play") includes maps having main topic IDs "1" and "675" (map not shown).

The methods described with respect to FIGS. 2-13 can be applied to tracking and illustrating presence in other documents. For instance, a word processing document, a slide presentation, or a spreadsheet document can be divided into multiple data objects. For example, each paragraph in a word processing document could be treated as a separate data object. Similarly, each row in a spreadsheet could be treated as a separate data object, and each slide in a slide presentation could be treated as a separate data object. Presence can be tracked and displayed for such data objects in the same way that it is tracked for individual topics. Data objects can be shared across documents the same way topics can be shared across maps. Also, an interface (like menu 360 shown in FIG. 3c) can be provided in documents/files that enable users present in a shared data object to initiate communications with each other.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for facilitating user collaboration and communication in a visual mapping system, the method comprising:
 tracking user presence in individual topics in the visual mapping system, wherein an individual topic is an individual hierarchical node within the visual mapping system that can be edited by a user and wherein user presence is only tracked for users that are online and that have selected a topic in the visual mapping system;
 displaying to an online user a visual map and an indication of any other online users' presence in individual topics in the visual map, wherein an indication of another online user's presence in an individual topic means that such other user has selected the topic and wherein the indication of user presence in the topic is displayed in connection with the topic; and
 providing an interface in the visual map through which the online user can initiate communications with any of such other online users.

2. The method of claim 1, wherein the visual mapping system is based on a client-server architecture, wherein users interface with the visual mapping system through a client visual mapping application, and wherein the client visual mapping applications, when online, send topics to and retrieve topics from a server in the visual mapping system.

3. The method of claim 2, wherein the server maintains a table in a database that relates each topic in the visual mapping system to the online users currently having presence in such topic.

4. The method of claim 3, wherein online client visual mapping applications poll the table to obtain updates to the table, thereby enabling the online client visual mapping applications to receive updates to user presence in topics.

5. The method of claim 4, wherein online client visual mapping applications dynamically update open visual maps to reflect changes in user presence in topics.

6. The method of claim 1, wherein the displaying step comprises:
 for each topic in the visual map in which another online user has presence, displaying an icon that represents other online user presence in the topic.

7. The method of claim 6, wherein, in response to the user mousing over the icon in a topic, displaying the names of the other online users having presence in such topic.

8. The method of claim 6, wherein an icon is displayed for each other online user having presence in the topic.

9. The method of claim 8, wherein, in response to the user mousing over one of such icons in a topic, displaying the name of the other online user associated with such icon.

10. The method of claim 1, wherein the interface enables the online user to initiate a phone conversation with any of such other online users having presence in a topic in the visual map.

11. The method of claim 10, wherein, in response to the online user electing to initiate a phone conversation with one of such other online users, retrieving the phone number for such other online user, and providing it to a voice over IP phone application.

12. The method of claim 1, wherein the interface enables the online user to initiate a chat session with any of such other online users having presence in a topic in the visual map.

13. The method of claim 12, wherein, in response to the online user electing to initiate a chat session with one of such other online users, establishing a chat session between the online user and such other online user.

14. The method of claim 1, wherein the interface enables the online user to initiate an instant meeting with any of such other online users having presence in a topic in the visual map.

15. The method of claim 14, wherein, in response to the online user electing to initiate an instant meeting with one or more of such other online users, establishing an instant meeting between the online user and such other online user or users.

16. The method of claim 1, wherein the interface enables the online user to send an email message to any of such other online users have presence in a topic in the visual map.

17. The method of claim 16, wherein, in response to the online user electing to send an email message to one or more of such other online users, retrieving the email address of such other online user or users and providing it to an email application.

18. The method of claim 1, wherein the interface is a dialog box with one or more communication options.

19. The method of claim 1, wherein the interface is a menu with one or more communication options.

20. A computer program embodied on a non-transitory computer-readable medium and comprising code, that when executed by a computer, enables the computer to perform the following method:
 tracking user presence in individual topics in a visual mapping system, wherein an individual topic is an individual hierarchical node within the visual mapping system that can be edited by a user and wherein user presence is only tracked for users that are online and that have selected a topic in the visual mapping system;
 displaying to an online user a visual map and an indication of any other online users' presence in individual topics in the visual map, wherein an indication of another online user's presence in an individual topic means that such other user has selected the topic and wherein the indication of user presence in the topic is displayed in connection with the topic; and providing an interface in the visual map through which the online user can initiate communications with any of such other online users.

21. The computer program of claim 20, wherein the interface enables the online user to initiate a phone conversation with any of such other online users having presence in a topic in the visual map.

22. The computer program of claim 20, wherein the interface enables the online user to initiate a chat session with any of such other online users having presence in a topic in the visual map.

23. The computer program of 20, wherein the interface enables the online user to initiate an instant meeting with any of such other online users having presence in a topic in the visual map.

24. The computer program of claim 20, wherein the interface enables the online user to send an email message to any of such other online users having presence in a topic in the visual map.

* * * * *